(12) United States Patent
Jeong et al.

(10) Patent No.: US 12,475,912 B2
(45) Date of Patent: Nov. 18, 2025

(54) AUGMENTED REALITY DEVICE PERFORMING AUDIO RECOGNITION AND CONTROL METHOD THEREFOR

(71) Applicant: Cochl Inc, Dover, DE (US)

(72) Inventors: Ilyoung Jeong, Seoul (KR); Hyungui Lim, Seoul (KR); Yoonchang Han, Seoul (KR); Subin Lee, Seoul (KR); Jeongsoo Park, Suwon-si (KR); Donmoon Lee, Seoul (KR)

(73) Assignee: Cochl Inc, Dover, DE (US)

( * ) Notice: Subject to any disclaimer, the term of this patent is extended or adjusted under 35 U.S.C. 154(b) by 345 days.

(21) Appl. No.: 17/911,637

(22) PCT Filed: Feb. 26, 2021

(86) PCT No.: PCT/KR2021/002497
§ 371 (c)(1),
(2) Date: Sep. 14, 2022

(87) PCT Pub. No.: WO2021/187771
PCT Pub. Date: Sep. 23, 2021

(65) Prior Publication Data
US 2023/0145966 A1 May 11, 2023

(30) Foreign Application Priority Data
Mar. 20, 2020 (KR) .................. 10-2020-0034136

(51) Int. Cl.
*G10L 25/48* (2013.01)
*G10L 15/06* (2013.01)

(52) U.S. Cl.
CPC .............. *G10L 25/48* (2013.01); *G10L 15/06* (2013.01)

(58) Field of Classification Search
CPC ...... G10L 25/48; G10L 15/06; G06T 2215/16; G06T 19/006; H04R 2430/20; H04S 7/40; H04S 2420/11
See application file for complete search history.

(56) References Cited

U.S. PATENT DOCUMENTS

| | | | |
|---|---|---|---|
| 10,142,618 B2 * | 11/2018 | Tsukahara | ............. H04N 23/689 |
| 2003/0053680 A1 * | 3/2003 | Lin | ......................... H04S 5/005 382/154 |

(Continued)

FOREIGN PATENT DOCUMENTS

| | | |
|---|---|---|
| CN | 103946733 A | 7/2014 |
| JP | 2019057047 A | 4/2019 |

(Continued)

*Primary Examiner* — Fariba Sirjani
(74) *Attorney, Agent, or Firm* — NKL Law; Jae Youn Kim

(57) ABSTRACT

Proposed is an augmented reality device capable of performing audio identification and a control method therefor. The augmented reality device comprises: a see-through display which is formed to enable a user's eyes to see therethrough and thus outputs a virtual object; an audio input unit which receives an input of an audio signal generated within a preset distance from the display; and a control unit which controls operations of the see-through display to identify event information corresponding to the audio signal and to output image information of the virtual object corresponding to the identified event information.

5 Claims, 8 Drawing Sheets

(56) References Cited

U.S. PATENT DOCUMENTS

| | | | |
|---|---|---|---|
| 2013/0124204 A1* | 5/2013 | Wong | H04R 29/008 |
| | | | 704/235 |
| 2014/0375683 A1* | 12/2014 | Salter | G06F 3/011 |
| | | | 345/633 |
| 2015/0302665 A1* | 10/2015 | Miller | G06F 3/016 |
| | | | 345/419 |
| 2017/0186441 A1* | 6/2017 | Wenus | H04N 7/15 |
| 2017/0277257 A1 | 9/2017 | Ota et al. | |
| 2018/0020312 A1 | 1/2018 | Visser et al. | |
| 2018/0284882 A1* | 10/2018 | Shipes | G06F 3/011 |
| 2020/0082842 A1* | 3/2020 | Brown | G10L 21/10 |
| 2020/0333876 A1* | 10/2020 | Shipes | H04R 5/033 |
| 2021/0312658 A1* | 10/2021 | Aoki | G06T 7/74 |
| 2023/0145966 A1* | 5/2023 | Jeong | H04S 7/40 |
| | | | 704/270 |

FOREIGN PATENT DOCUMENTS

| | | |
|---|---|---|
| JP | 2019527956 A | 10/2019 |
| JP | 2019531538 A | 10/2019 |
| KR | 20130097855 A | 9/2013 |
| KR | 20160023888 A | 3/2016 |
| KR | 2018106605 A1 | 6/2018 |
| KR | 1020190028697 A | 3/2019 |
| KR | 20190038900 A | 4/2019 |

\* cited by examiner

AUGMENTED REALITY DEVICE PERFORMING AUDIO RECOGNITION AND CONTROL METHOD THEREFOR

TECHNICAL FIELD

The present invention relates to an augmented reality (AR) device. Specifically, the present invention relates to an AR device for performing audio identification and a control method thereof.

BACKGROUND ART

Augmented reality (AR) is technology for displaying an image by overlapping a three-dimensional (3D) virtual image on an image or background of reality. That is, AR is defined as outputting image information corresponding to a virtual object on transparent glass while a user is provided with an image of reality through the transparent glass, thereby expanding the user's senses and perception.

Recently, AR services using mobile devices have rapidly increased as mobile terminals and smart phones each including therein a camera and various types of sensors such as a Global Positioning System (CPS) sensor have come into widespread use and a variety of convergence services using high-speed mobile Internet have been introduced.

Meanwhile, artificial intelligence technologies such as deep learning have been applied to process audio data. An audio identification technique, which is one processing technique related to audio data, has been developed to detect a subject that generates an audio input and a situation in which the audio input is generated by the subject.

As the accuracy of audio recognition and the arithmetic capacity of devices have improved with advances in artificial intelligence, a time required to perform audio identification has decreased and thus a user is able to perform audio identification on input audio information in real time.

Therefore, various studies are being conducted to expand a user's sensory area by converging the audio identification technology with an AR device.

DISCLOSURE

Technical Problem

The present invention is directed to providing an augmented reality (AR) device for intuitively informing a user of an event occurring near the user using audio identification technology, and a control method thereof.

The present invention is also directed to providing an AR device for identifying audio information generated near a user so that the user may recognize audio generated outside a visible area, and a control method thereof.

The present invention is also directed to providing an AR device for detecting in real time a label and source of a sound generated in its vicinity and outputting a virtual object according to the label and source of the sound, and a control method thereof.

The present invention is directed to providing an AR device for providing a virtual object by linking audio information and image information to each other to expand a user's cognitive area, and a control method thereof.

The present invention is directed to providing an AR device that operates on the basis of attributes of audio information generated in its vicinity.

Technical Solution

According to an aspect of the present invention, an augmented reality (AR) device includes a see-through display configured to allow a user's eyes to see a virtual object therethrough and output image information of the virtual object, an audio inputter configured to receive an audio signal generated at a preset distance or less from the see-through display, and a controller configured to identify event information corresponding to the audio signal and control an operation of the see-through display to output image information of a virtual object corresponding to the identified event information.

According to another aspect of the present invention, the image information may include at least one of text, an image, and position information associated with the audio signal, and the controller may detect a position of a point at which the audio signal is generated and control an operation of the see-through display to include information related to the position at which the image information is detected.

Advantageous Effects

According to the present invention, a sound generated in an area that is not visible to a user is converted into visual information and the visual information is output, so that a user may accurately recognize the sound generated near the user.

According to the present invention, it is possible to achieve an effect that can give users who have lost their hearing ability the feeling of viewing information related to various types of sounds generated in their vicinity.

In addition, according to the present invention, it is possible to achieve an effect of maximizing a user's sensory area by combining an audio signal generated in its vicinity and a virtual object generated by augmented reality.

BEST MODE

Provided is an augmented reality (AR) device including a see-through display configured to allow a user's eyes to see a virtual object therethrough and output image information of the virtual object, an audio inputter configured to receive an audio signal generated at a preset distance or less from the see-through display, and a controller configured to identify event information corresponding to the audio signal and control an operation of the see-through display to output image information of a virtual object corresponding to the identified event information.

Modes of the Invention

Hereinafter, embodiments set forth herein will be described in detail with reference to the accompanying drawings, and it should be understood that the technical terms used herein are only used to describe certain embodiments and are not intended to limit the technical idea described herein.

As described above, a user of an augmented reality (AR) device is likely to obtain information about functions of components of the AR device that interact with each other. Thus, the embodiments set forth herein are related to providing such information through a see-through display device. For example, as will be described below, the see-through display device is configured to provide information about functions of interactive components of the AR device in the form of an AR image displayed in a field of view of a user of the AR device.

Figure 1:
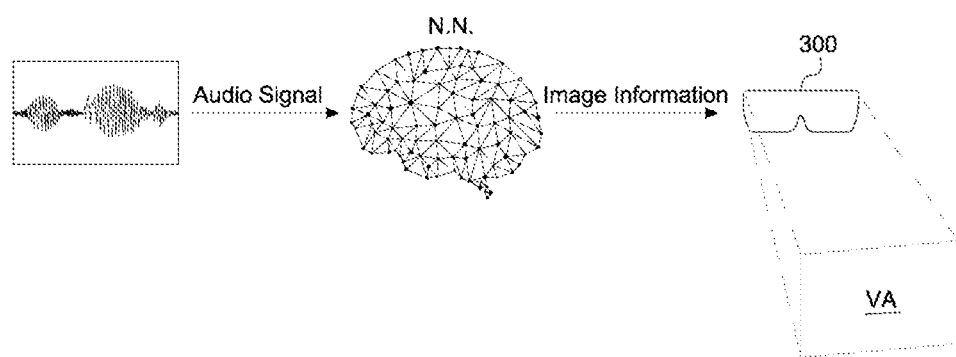
FIG. 1 is a conceptual diagram illustrating a system including an augmented reality (AR) device.

FIG. 1 is a conceptual diagram illustrating a system including an AR device. Referring to FIG. 1, according to an embodiment of the present invention, an audio signal may be received through an inputter 100, and event information corresponding to the audio signal may be identified and image information of a virtual object corresponding to the identified event information may be output through a see-through display 300 under control of the controller 200. Specifically, an audio signal may be received, and may be detected, identified, and matched to image information through an artificial neural network and thereafter transmitted visually to a user through the see-through display 300. Here, the see-through display 300 may be provided in the form of smart glass as will be described below. The smart glass is based on the related art, and may include a frame part supporting the shape of the glass, a fixing part for fixing the smart glass on a user, and a lens part mounted on the frame part to allow the user to view a visible area through the lens part and to check AR image information. The smart glass may further include a camera and various types of sensors, and may further include a microphone for detecting an audio signal. According to an embodiment, the AR device may be configured as an AR display through which a user may allow an audio signal to interact with image information in an intuitive way. Here, the AR display may be the see-through display 300 described above, e.g., AR glasses or a head-mounted display. Here, the lens part may be formed of a transparent or see-through material such as glass or plastic so that a user who is wearing the see-through display 300 may observe actual scenes clearly. In addition, the lens part may be configured to project content such as digital AR image information. Therefore, the user who is wearing the see-through display 300 is able to observe a scene of reality and projected digital image information simultaneously.

Figure 2:
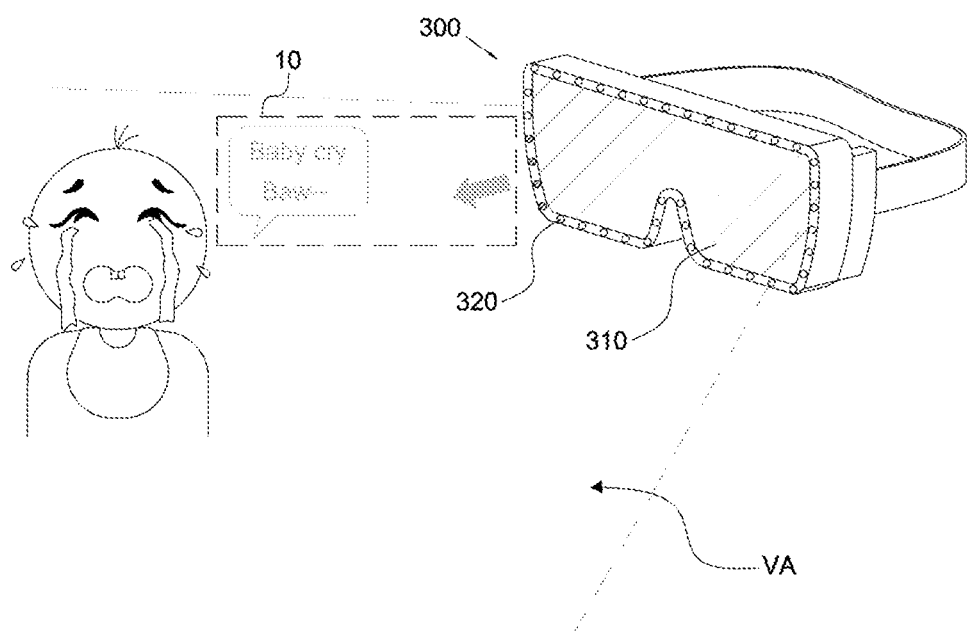
FIG. 2 is a perspective view of an AR device.

FIG. 2 is a perspective view of an AR device and illustrates an example of a physical space including the AR device. A user is able to view a visible area VA through a see-through display 300 of the AR device, and such an embodiment is as shown in FIG. 2. The above-described see-through display 300 may be provided in the form of goggles or glasses so that a user may use his or her two hands freely. The see-through display 300 includes an AR outputter 310 configured to allow a user to build visual information of the appearance of the physical space and an information display 320 for guiding an orientation, position, etc. of an audio signal. When light from the physical space passes through the see-through display 300, a user may view one or more virtual objects overlaid on the physical space while viewing the physical space directly. According to an embodiment, when a user's eyes directly point toward the visible area VA through the AR outputter 310, the see-through display 300 displays one or more virtual objects in the form of information about at least one function of the AR device. Here, the displayed information is obtained in an appropriate way. For example, the displayed information may be received from a computing device, received from a computing device at a remote plate through a network, or received from the AR device or the like.

The see-through display 300 according to the present invention may be in the form of goggles as shown in FIG. 2 but is not limited thereto and may be in any other appropriate form. An embodiment will be described briefly with reference to FIG. 2 below. A user may visually check the visible area VA in real time through the see-through display 300. When an audio signal is generated in the visible area VA, a position of a point at which the audio signal is generated may be detected, position information may be displayed on a portion of the information display 320 corresponding to the position, and image information 10 of a virtual object may be projected to be overlapped on the position of the point at which the audio signal is generated. In detail, information of the audio signal, i.e., the type and sound of the audio signal, may be visually projected so that even users who cannot check the information of the audio signal auditorily may be able to check the audio signal visually.

Figure 3:
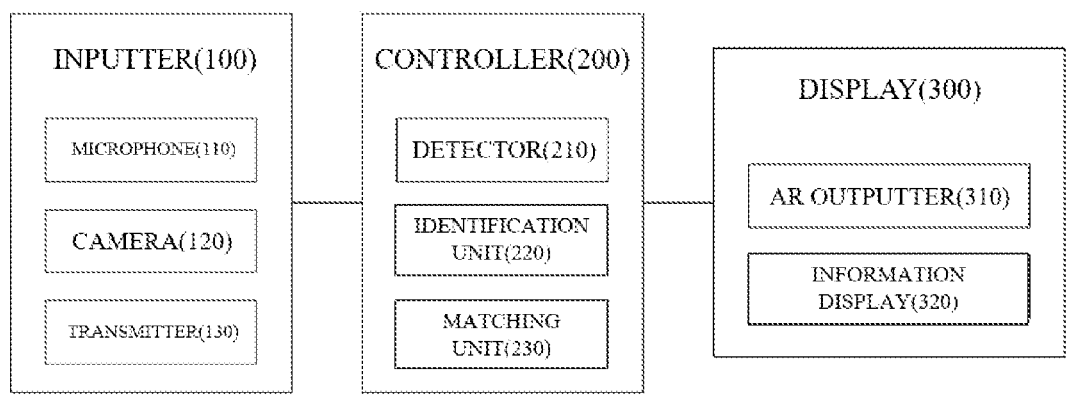
FIG. 3 is a block diagram illustrating components of an AR device.

An AR device of the present invention will be described in detail with reference to FIG. 3 below. FIG. 3 is a block diagram illustrating components of an AR device.

Referring to FIG. 3, according to an embodiment, an AR device of the present invention may include a see-through display 300 configured to allow a user's eyes to see a virtual object therethrough and output image information 10 of a virtual object, an audio inputter 100 configured to receive an audio signal generated at a preset distance or less from the see-through display 300, and a controller 200 configured to identify event information corresponding to the audio signal and control an operation of the see-through display 300 to output the image information 10 of the virtual object corresponding to the identified event information.

Specifically, the inputter 100 is configured to receive an audio signal and an image signal and transmit the audio signal and the image signal to the controller 200, and may include a microphone 110, a camera 120, and a transmitter 130. The microphone 110 is configured to receive an audio signal generated at a preset distance or less from the see-through display 300, and when an audio signal is generated at the preset distance while a user is wearing the see-through display 300, the audio signal may be input through the microphone 110 and transmitted to the controller 200 through the transmitter 130. In this case, the inputter 100 may be installed on a part of the see-through display 300 and may further include the camera 120 for performing photographing in one direction, so that an image may be captured in front of the see-through display 300, which a user is wearing, by the camera 120. In detail, a user's visible area VA seen through the see-through display 300 may be photographed by the camera 120 and an image signal may be transmitted to the controller 200 through the transmitter 130.

The controller 200 includes a detector 210, an identification unit 220, and a matching unit 230 to detect information on the basis of an audio signal and an image signal input to and transmitted from the inputter 100, and identify and match provided event information. The detector 210 may detect the type of the audio signal transmitted from the inputter 100 and a position of a point at which the audio signal is generated, and control an operation of the see-through display 300 to include information related to the detected type and position into the image information 10. In detail, an audio signal and an image signal may be transmitted to the controller 200 from the inputter 100. Here, the detector 210 may detect a type or situation of the audio signal and detect an image signal corresponding to the audio signal from among image signals. According to an embodiment, as shown in FIG. 2, when a baby's cry is input in the form of an audio signal through the microphone 110 of the inputter 100, an image signal of the crying baby is input through the camera 120, and the audio signal and the image signal are transmitted to the controller 200, the detector 210 may detect a distance to a point at which the transmitted audio signal is generated, an intensity of the audio signal, etc. using two or more audio sensors to detect a position of the point at which the audio signal is generated. That is, when the baby's cry is input in the form of the audio signal, a direction and position of the baby's cry may be detected through the detector 210. At the same time, an image signal of the direction and position of the baby's cry may be detected on the basis of the input image signal and analyzed concretely. The direction and position of the audio signal and the image signal that are detected through the detector 210 may be identified through the identification unit 220 concretely. In detail, the identification unit 220 may identify the type or situation of the audio signal through an artificial neural network installed in the identification unit 220, and identify and extract the image information 10 corresponding to the type or situation of the audio signal from the image signal. Specifically, referring to FIG. 2, the audio signal may be identified as the baby's cry through the artificial neural network by analyzing a wavelength, waveform, frequency, etc. of the audio signal. Alternatively, an image signal corresponding to the identified audio signal may be identified while identifying the audio signal. That is, when the audio signal is identified as the baby's cry, the baby may be identified by detecting the baby in the received image signal. Thereafter, when the audio signal and the image signal are identified, an operation of the see-through display 300 may be controlled to match the audio signal and the image signal to each other such that the image information 10 of the virtual object may overlap an image signal corresponding to a position on the screen of the see-through display 300 on which the audio signal is generated. That is, when a baby's cry is input in the form of an audio signal and a baby is detected from the image signal, the baby and the baby's cry may be matched to each other to control information about the baby's cry to be overlapped near the detected baby through augmented reality. Here, the overlapped image information 10 may include at least one of text, an image, and position information associated with the identified audio signal. The text may be written in letters, and a subject, e.g., a human being, a thing or an animal, that generates the audio signal may be displayed in the form of an image. Position information of a point at which the audio signal is generated may be provided in the form of text, an image, a mark indicating a direction and the point, or the like. The image information 10 of the audio signal identified and matched by the controller 200 may be output through the see-through display 300. In detail, the see-through display 300 includes an AR outputter 310 and an information display 320. The AR outputter 310 is configured to output the image information 10 to be overlapped on a visible area of a user who is wearing the see-through display 300 through augmented reality, and the information display 320 may be configured to display information about the position or direction of the point at which the audio signal is generated in a circumferential direction of the see-through display 300.

Figure 4:
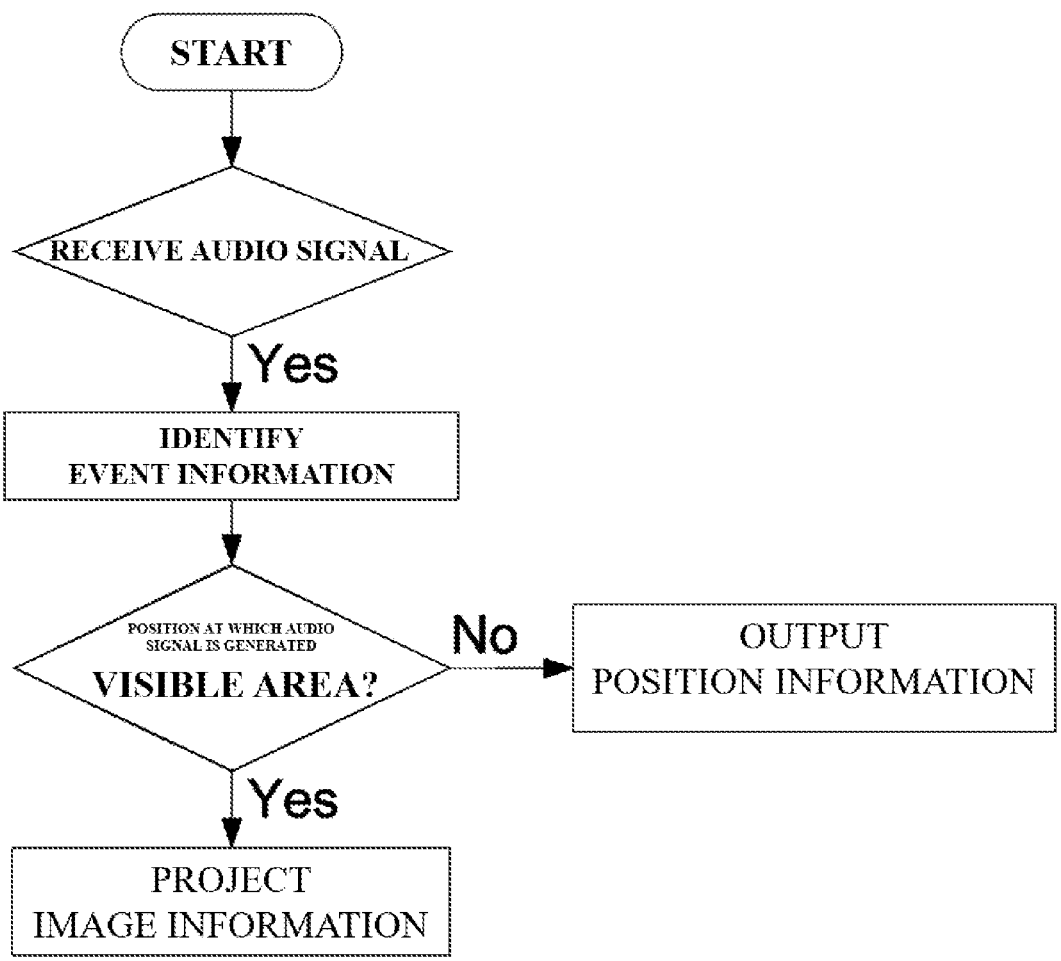
FIG. 4 is a flowchart of a control method of an AR device according to the present invention.

A control method of an AR device according to the present invention will be described in detail with reference to FIG. 4 below. FIG. 4 is a flowchart of a control method of an AR device according to the present invention.

Referring to FIG. 4, a user may wear the see-through display 300 and identify a visible area VA through the AR outputter 310. In this case, when an audio signal is generated at a preset distance or less from the see-through display 300, the audio signal may be received through the inputter 100. When the audio signal is received, event information corresponding to the audio signal may be identified, and image information 10 of a virtual object corresponding to the identified event information may be output onto the visible area VA through the AR outputter 310 and the information display 320. However, after the event information is identified, whether a position of a point at which the audio signal is generated is within the visible area VA may be determined, and thereafter the image information 10 may be projected when the position is within the visible area VA and the position information may be output when the position is outside the visible area VA, so that a user may move such that the position of the point at which the audio signal is generated is within the visible area VA. Specifically, the controller 200 may control an operation of the see-through display 300 to detect a direction in which an audio signal is input on the basis of an orientation of a part of the see-through display 300 that a user is wearing, and to include information related to the detected direction in the image information 10. Here, the information related to the detected direction, which is included in the image information 10, may display the direction in and a position at which the audio signal is detected, and the image information 10 may be overlapped on the point at which the audio signal is detected through augmented reality. Specifically, when the position of the point at which the audio signal is generated is outside a visible area seen by a user through the see-through display 300, the controller 200 may control an operation of the see-through display 300 to output the image information 10 related to the position. When the position of the point at which the audio signal is generated is within the visible area, an operation of the see-through display 300 may be controlled to overlap the image information 10 of the virtual object on a part of the screen of the see-through display 300 on which the position of the generated audio signal is projected.

An embodiment will be described in more detail with reference to FIGS. 5 to 8 below. FIGS. 5 to 8 are views illustrating examples of an AR device according to the present invention.

Figure 5:
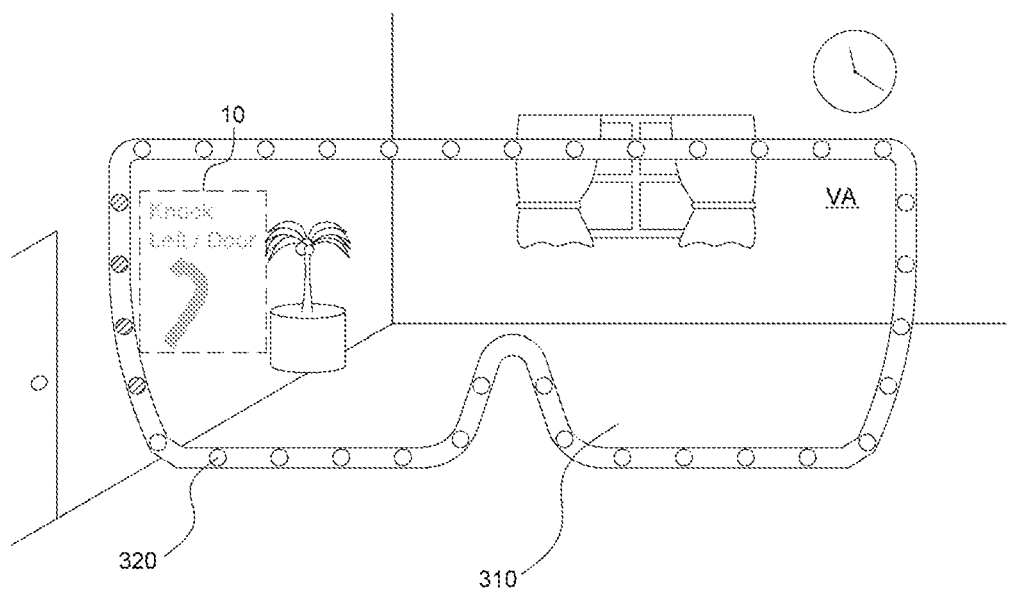
FIGS. 5 to 8 are views illustrating examples of an AR device according to the present invention.

First, referring to FIG. 5, when an audio signal is generated outside a visible area VA seen to a user through the see-through display 300, i.e., when a knock on a left door that is not visible to the user is output through the AR outputter 310 as shown in FIG. 5, image information 10 related to a position of a point at which a corresponding audio signal is generated may be output through the AR outputter 310. Specifically, referring to FIG. 5, when the knock does not occur within the user's visible area VA, the position of the point at which the audio signal is generated or the direction in which the audio signal is generated may be displayed so that the user's visible area VA may be changed to include the position of the audio signal. That is, when a sound is generated on the left door, a knock which is a type of sound may be displayed and the image information 10 related to a position may be output using an indication of direction, an arrow or the like. More specifically, the image information 10 may be output while displaying an object that generates the audio signal. At the same time, information may be displayed in the direction on a plurality of information displays 320 provided at an outer side of the see-through display 300 to inform a user about the direction in which the audio signal is generated. In this case, the information displays 320 may guide the user through information about the direction using light-emitting diode (LED) notification or vibration notification.

Figure 6:
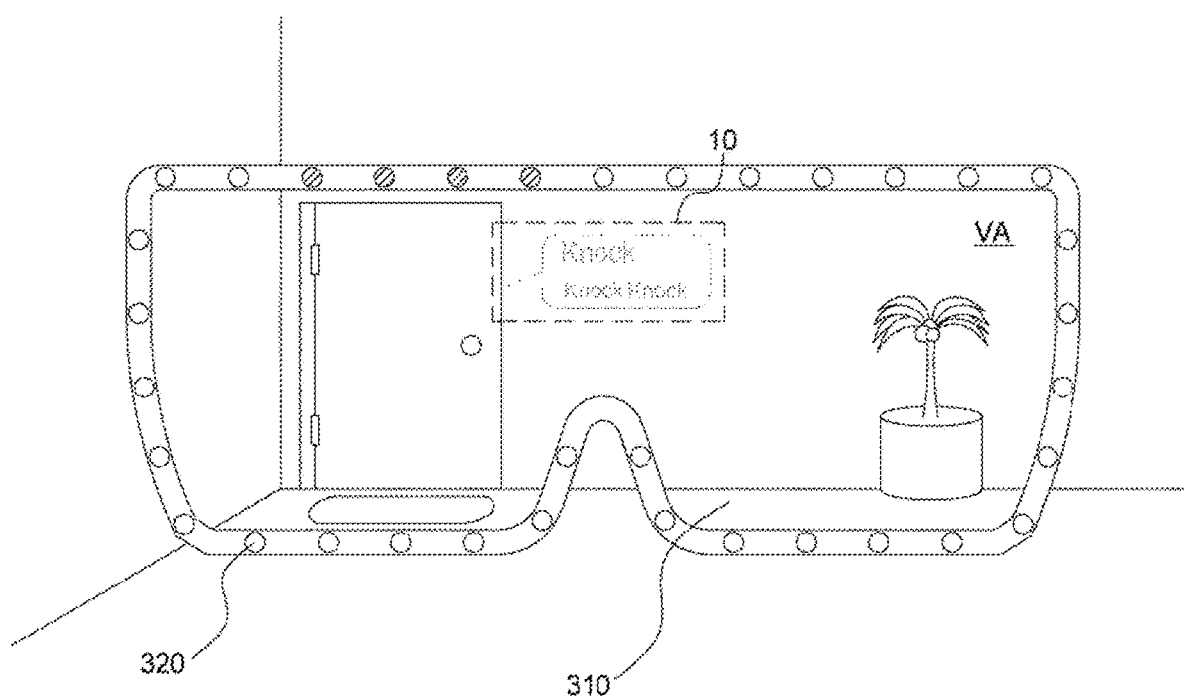

FIG. 6 illustrates a screen obtained when a user turns his or her head to the left to change a position of a point at which an audio signal is generated to be within the visible area VA of FIG. 5, after the user views the image information 10 related to a direction or a position in the visible area VA. As shown in FIG. 5, when the position of the point at which the audio signal is generated is not within the visible area VA, the user may be informed of the position and direction and may move the visible area VA toward the position of the point at which the audio signal is generated. Therefore, when the position of the point at which the audio signal is generated is within the visible area VA as shown in FIG. 6, an operation of the see-through display 300 may be controlled to overlap the image information 10 of a virtual object on a part of the AR outputter 310, on which the position of the point at which the audio signal is generated is projected, in a screen displayed on the see-through display 300. That is, when there is a knock on a door, a user moves the visible area VA toward the door, and the door is thus within the visible area VA, a type and sound of an audio signal may be displayed in an image, letters or the like to overlap the door on which an audio signal is generated to notify of the knock. In this case, the image information 10 to be overlapped may be displayed differently according to a type of the audio signal, an object or the like. Specifically, an icon may be displayed differently or a shape, color, etc. of a speech bubble may be displayed differently according to an object such as a thing, a human being or an animal, so that a user may intuitively identify the object of the sound. In detail, FIGS. 6 to 8 will be compared with one another.

Figure 7:
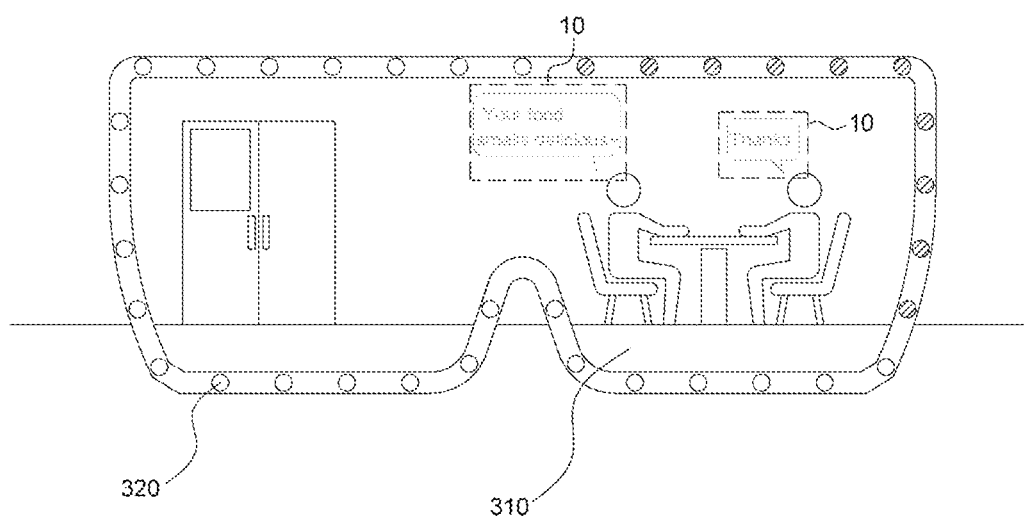
Figure 8:
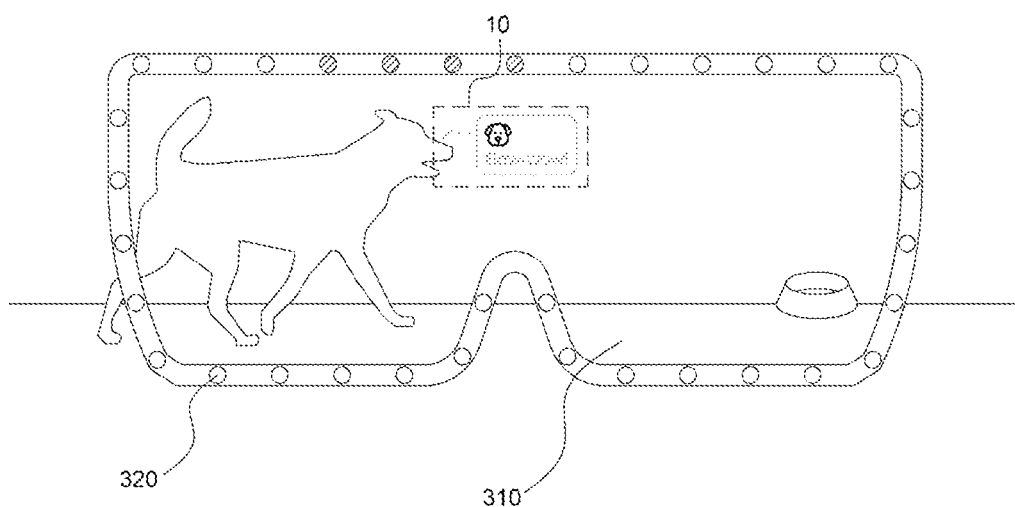

FIG. 6 relates to an audio signal of a knock on a door, and the type of sound and the sound may be displayed on an object, on which an audio signal is to be generated, in letters in a round or quadrangular box with a leader line as shown in FIG. 6. FIG. 7 relates to an audio signal of dialogue between persons, and when a person who is talking is within a visible area VA, image information 10 of an audio signal may be displayed to overlap an audio signal. In this case, the person's speech may be overlapped to match the person through a speech bubble. Therefore, a user is able to communicate with other persons without hearing them. FIG. 8 illustrates an embodiment in which an animal's sound is input as an audio signal. When a dog's bark is input in the form of an audio signal, image information 10 may be provided by matching a curved leader line to the vicinity of the dog. In this case, an icon indicating the dog may be displayed on the image information 10 so that a user may recognize in an intuitive manner that the audio signal is generated by the dog.

According to the above-described embodiments, in the present invention, after an audio signal is received, the audio signal is matched to an image signal on the see-through display 300 to match the audio signal to the image information 10, so that a user may be provided with information about the audio signal visually. In this case, a process of identifying an audio signal, extracting an image signal corresponding to the type of the audio signal from among image signals, and matching the audio signal to the image signal to display image information 10 may be performed by an artificial neural network installed in the controller 200, and the artificial neural network may be trained as an AR device of the present invention is used repeatedly by a user and thus is capable of providing more accurate and expanded information.

Although the see-through display 300 has been described herein with respect to, for example, smart glass, the smart glass is only an example and the see-through display 300 may be an image processing device, such as a mobile phone, a laptop computer or a wearable device, an audio analysis device or the like.

The embodiments of the present invention set forth herein are only examples and thus various modifications may be made and other equivalent embodiments may be implemented by those of ordinary skill in the art from the embodiments set forth herein. Therefore, the scope of the present invention is not limited by the above-described embodiments and the accompanying drawings.

INDUSTRIAL APPLICABILITY

According to the present invention, a sound generated in an area that is not visible to a user is output by being converted into visual information, so that a user may accurately recognize the sound generated around the user.

According to the present invention, it is possible to achieve an effect that can give users who have lost their hearing ability the feeling of viewing information related to various types of sounds generated in their vicinity.

In addition, according to the present invention, it is possible to achieve an effect of maximizing a user's sensory area by combining an audio signal generated in their vicinity and a virtual object generated by augmented reality.

The invention claimed is:

1. An augmented reality device comprising:
a see-through display configured to allow a user's eyes to see a virtual object therethrough and output image information of the virtual object;
an audio input device configured to receive an audio signal generated at a preset distance or less from the see-through display;
a camera installed on a part of the see-through display and configured to perform photographing in one direction; and
a controller configured to identify event information corresponding to the audio signal through an artificial neural network and control an operation of the see-through display to output image information of the virtual object corresponding to the identified event information,
wherein the controller identifies at least one object included in image information taken by the camera through the artificial neural network corresponding to a type or situation of the audio signal,
wherein, when the audio signal is identified as a certain type of event information and the virtual object of the certain type corresponding to that of the event information is identified from the image information, the controller matches the audio signal and an image signal to each other such that the image information of the virtual object overlaps the image signal corresponding to a position on a screen of the see-through display on which the audio signal is generated, and
wherein, when a position of a point at which the audio signal is generated is outside a visible area that is visible to a user through the see-through display, the controller controls an operation of the see-through display to output image information associated with the position and a direction of the point.

2. The augmented reality device of claim 1, wherein the image information comprises at least one of text, an image, and position information associated with the audio signal.

3. The augmented reality device of claim 1, wherein the controller detects the position of the point at which the audio signal is generated and controls an operation of the see-through display to include information related to the detected position in the output image information.

4. The augmented reality device of claim 3, wherein the controller detects a direction in which the audio signal is input on the basis of an orientation of a part of the see-through display and controls an operation of the see-through display to include information related to a direction in which the image information is detected.

5. The augmented reality device of claim 1, wherein, when the position of the point at which the audio signal is detected is within the visible area, the controller controls the operation of the see-through display to overlap the image information of the virtual object on a part of the screen of the see-through display onto which the position is projected.

* * * * *